(12) United States Patent
Payton

(10) Patent No.: US 7,194,128 B1
(45) Date of Patent: Mar. 20, 2007

(54) DATA COMPRESSION USING PRINCIPAL COMPONENTS TRANSFORMATION

(75) Inventor: Paul M. Payton, Burlingame, CA (US)

(73) Assignee: Lockheed Martin Corporation, Bethesda, MD (US)

(*) Notice: Subject to any disclaimer, the term of this patent is extended or adjusted under 35 U.S.C. 154(b) by 10 days.

(21) Appl. No.: 10/919,397

(22) Filed: Aug. 17, 2004

Related U.S. Application Data

(63) Continuation-in-part of application No. 10/870,422, filed on Jun. 18, 2004, now abandoned, which is a continuation of application No. 09/625,859, filed on Jul. 26, 2000, now Pat. No. 6,754,383.

(51) Int. Cl.
G06K 9/00 (2006.01)
G06K 9/36 (2006.01)

(52) U.S. Cl. ..................................... 382/166
(58) Field of Classification Search .............. 382/162, 382/166, 232, 233, 238, 239, 244, 248, 250, 382/251, 252; 358/523, 525; 345/600–603; 375/240.15, 240.17, 240.26
See application file for complete search history.

(56) References Cited

U.S. PATENT DOCUMENTS

| 5,014,198 A | 5/1991 | Umemura |
| 5,196,946 A | 3/1993 | Balkanski et al. |
| 5,253,078 A * | 10/1993 | Balkanski et al. .......... 382/250 |
| 5,422,736 A | 6/1995 | Katayama |
| 5,465,164 A | 11/1995 | Sugiura et al. |
| 5,619,995 A * | 4/1997 | Lobodzinski ............... 600/425 |
| 5,680,129 A | 10/1997 | Weinberger et al. |
| 5,798,753 A * | 8/1998 | Zhou et al. .................. 345/603 |
| 5,982,432 A | 11/1999 | Uenoyama et al. |
| 6,049,775 A | 4/2000 | Gertner et al. |
| 6,125,201 A | 9/2000 | Zador |
| 6,157,734 A * | 12/2000 | Iida ............................ 382/162 |
| 6,195,466 B1 | 2/2001 | Schwartz et al. |
| 6,198,772 B1 * | 3/2001 | Boice et al. ........... 375/240.17 |
| 6,236,749 B1 | 5/2001 | Satonaka et al. |
| 6,259,741 B1 * | 7/2001 | Chen et al. ............ 375/240.26 |
| 6,266,440 B1 | 7/2001 | Oneda |
| 6,308,193 B1 | 10/2001 | Jang et al. |
| 6,404,928 B1 | 6/2002 | Shaw et al. |
| 6,427,029 B1 | 7/2002 | Kono et al. |

(Continued)

OTHER PUBLICATIONS

European Search Report dated Mar. 18, 2005, in EP 01850124.7.

(Continued)

*Primary Examiner*—Amir Alavi
(74) *Attorney, Agent, or Firm*—McDermott Will & Emery LLP

(57) ABSTRACT

A method for compressing and reconstructing a color image sequence using principal components transformation. Color image information for individual images from a color image sequence is received, and the color image information is converted into intrinsic color information. The intrinsic color information is transformed into transformed information using an MPEG DCT algorithm, and the transformed information is quantized into quantized information. The quantized information is encoded into encoded information, and stored. In an additional arrangement, the encoded information is reconstructed using non-pixel data.

24 Claims, 11 Drawing Sheets

U.S. PATENT DOCUMENTS

| | | | |
|---|---|---|---|
| 6,453,072 B1 | 9/2002 | Hatakenaka | |
| 6,453,073 B2 | 9/2002 | Johnson | |
| 6,483,875 B1* | 11/2002 | Hasebe et al. | 375/240.15 |
| 6,754,383 B1* | 6/2004 | Payton | 382/166 |
| 6,819,322 B2* | 11/2004 | Emerson et al. | 345/520 |
| 6,832,006 B2* | 12/2004 | Savakis et al. | 382/239 |
| 6,868,190 B1* | 3/2005 | Morton | 382/278 |
| 2003/0016233 A1* | 1/2003 | Charpentier | 345/619 |
| 2003/0174896 A1* | 9/2003 | Ridge | 382/239 |
| 2004/0212692 A1* | 10/2004 | Nakami et al. | 348/224.1 |
| 2004/0258301 A1* | 12/2004 | Payton | 382/166 |

OTHER PUBLICATIONS

"Three-Dimensional Transform Coding Of Multispectral Data", by John A. Saghri, et al., 1993 IEEE, pp. 1342-1346.

"Terrain-Adaptive Transform Coding of Multispectral Data", by John A. Saghri, et al., 1994 IEEE, pp. 313-316.

"Coding of Spectrally Homogenous Regions in Multispectral Image Compression", by Gabriel Fernandez, et al., 1996 IEEE, pp. 923-926.

"An Efficient Adaptive KLT For Multispectral Image Compression", by Lena Chang, et al., 2000 IEEE, pp. 252-255.

* cited by examiner $$\begin{vmatrix} r'*r' & r'*g' & r'*b' \\ g'*r' & g'*g' & g'*b' \\ b'*r' & b'*g' & b'*b' \end{vmatrix} \qquad \begin{array}{l} r'=r-m_r \\ g'=g-m_g \\ b'=b-m_b \end{array}$$

DATA COMPRESSION USING PRINCIPAL COMPONENTS TRANSFORMATION

CROSS-REFERENCE

This application is a continuation-in-part application of U.S. patent application Ser. No. 10/870,422, filed Jun. 18, 2004, now abandoned which is a continuation of U.S. patent application Ser. No. 09/625,859, filed Jul. 26, 2000 (issued as U.S. Pat. No. 6,754,383 on Jun. 22, 2004), both of which are incorporated herein for all purposes.

STATEMENT AS TO RIGHTS TO INVENTIONS MADE UNDER FEDERALLY SPONSORED RESEARCH OR DEVELOPMENT

Not Applicable.

FIELD OF INVENTION

The present invention relates to true color image compression and reconstruction for individual frames of an image sequence. More particularly, the present invention relates to lossy compression and reconstruction using an image specific color transformation.

BACKGROUND OF THE INVENTION

JPEG (pronounced "jay-peg") is a standardized image compression mechanism. JPEG stands for Joint Photographic Experts Group, the original name of the committee that wrote the standard. JPEG is designed for compressing either full-color or gray-scale images of natural, real-world scenes. It works well on photographs, naturalistic artwork, and similar material; not so well on lettering, simple cartoons, or line drawings. JPEG handles only still images.

JPEG is "lossy," meaning that the decompressed image isn't quite the same as the one you started with. JPEG achieves much greater compression than is possible with lossless methods. JPEG is designed to be lossy, and thus exploits the known limitations of the human eye. More specifically, the fact that small color changes are perceived less accurately than small changes in brightness. Thus, JPEG is intended for compressing images that will be looked at by humans. In contrast, the small errors introduced by JPEG may be a problem for images intended to be machine-analyzed.

A useful property of JPEG is that adjusting compression parameters can vary the degree of lossy-ness. This means that the image-maker can trade off file size against output image quality. You can make extremely small files if you don't mind poor quality, such as indexing image archives. Conversely, if you aren't happy with the output quality at the default compression setting, you can increase the quality until you are satisfied, and accept lesser compression.

The JPEG compression algorithm may be implemented in both software and hardware. For example, C-Cubed Microsystems introduced the first JPEG chip for compressing digital video images. Hardware provides the requisite speed for real-time compression. JPEG++, an algorithm described in U.S. Pat. No. 5,014,198, developed by Storm Technology, is an extension to JPEG. JPEG++ allows selected picture areas to be compressed at different ratios depending on the significance of the visual impact to the area in the image.

Similarly, "MPEG," short for "Moving Picture Experts Group," and pronounced "em-peg," refers to the family of digital video compression standards and file formats developed by the group. MPEG generally produces comparable quality video to competing formats, such as Indeo® and Quicktime®; MPEG files can be decoded by special hardware or software. MPEG achieves a high compression rate by storing only the elements of a moving image which change from one frame to another instead of an entire frame. MPEG also uses a type of lossy compression, but the diminishment of data is generally imperceptible to the human eye.

Both MPEG and JPEG compression use an encoding technique called discrete cosine transformation ("DCT"). DCT is a technique for representing waveform data as a weighted sum of cosines, resulting in lossy compression. DCT itself does not lose data, rather the data compression technologies that rely on DCT approximate some of the coefficients to reduce the amount of data.

One problem with the both the traditional JPEG and MPEG algorithms as well as other similar compression techniques, is that they all employ a fixed color space transformation. Generally, a fixed color space transformation is employed to transform an image from RGB into a luminance/chrominance color space (i.e., "YUV"), where luminance is the first component and chrominance the second and third components. To perform the transform a fixed predetermined matrix is employed that transforms the image from a RGB color space into a luminance/chrominance color space represented in an unsigned byte form (i.e., "YCrCb"). The rationale for using a luminance/chrominance color space is that some chrominance information can be lost in an image since the human eye is less likely to perceive the changes in the chrominance or color component of a reconstructed image. As a result, the chrominance components are sub-sampled or reduced, while the luminance component is left at full resolution.

Unfortunately, the use of a predetermined matrix to execute the transformation does not ensure the most information is presented in the first component because it does not consider the wide variety of possible scene content. More specifically, the transformation does not actively control or attempt to provide the most information about an individual image in the first component. Consequently, all images are treated equally despite the errors that may occur when reconstructing a compressed image, and thus affect image perception. Accordingly, images or applications that have a lower tolerance for loss are compressed at lower ratios since more information in the second and third components is required. This results in larger files, and thus less file storage space. In addition, larger files require significantly more time to transmit from a host to a remote site than smaller files. As a result, a method is needed that provides optimal image compression to improve file storage capacity and transmission time, while reducing image quality degradation for a single image or for each frame of an image sequence.

SUMMARY OF THE INVENTION

Based on the above and foregoing, it can be appreciated that there presently exists a need in the art for a computer system and corresponding operating method which overcomes the above-described deficiencies. The present invention was motivated by a desire to overcome the drawbacks and shortcomings of the presently available technology, and thereby fulfill this need in the art.

It is therefore a feature and advantage of the present invention to provide an image compression and reconstruction technique that improves the image quality of a reconstructed image.

It is another feature and advantage of the present invention to reduce image quality degradation at high compression ratios.

It is another feature and advantage of the invention to optimize utilization of file space.

It is a further feature and advantage of the invention to compress video sequences of color images utilizing a transformation that varies for variable-length subsequences of images dependent on color distribution statistics.

It is another feature and advantage of the invention to generate a transformation based on the color image's color distribution for variable-length subsequences of frames comprising a video image sequence.

It is a further feature and advantage of the invention to reduce transmission time in sending compressed images representing multiple frames of an image sequence.

Further features and advantages of the invention will become apparent to those skilled in the art with reference to the accompanying figures and written description below.

The present invention is a system, method, and computer program product for compression and reconstruction of video image streams and image sequences using principal components transformation data that is periodically updated and transmitted in the compressed data stream. The method is performed on a computer or other programmable data processing apparatus. The method is performed as a variant of the standard JPEG or MPEG image compression techniques.

According to one aspect of the present invention, color image information for a color image from an image sequence is received, and the color image information is converted into intrinsic color information. The intrinsic color information is used to transform the color image and a variable number of succeeding frames into principal component space for use in the MPEG DCT algorithm.

In an additional arrangement, the encoded information is periodically reconstructed using non-pixel data. The present invention determines when updates of the intrinsic color information are computed as a factor of how successor frames deviate from the previous color frame in color statistics. The intrinsic color information is melded into the encoded bit stream of compressed imagery data and stored. In an additional arrangement, the encoded imagery information is reconstructed using the periodically-updated non-pixel color transformation information.

According to an additional aspect of the present invention, color image information for a color image from an image sequence is received and the color image information is converted into intrinsic color information. The intrinsic color information is used to transform the color image and a variable number of succeeding frames into a principal components space for use in the MPEG DCT algorithm. The present invention determines when periodic updates of intrinsic color information are computed as a factor of how successor frames deviate from previous color frames in color statistics.

The transformation is based on the color image's intrinsic color distribution and how this distribution varies from previous frames' distributions. The intrinsic color distribution is melded into the encoded bit stream of compressed imagery data and transmitted. The intrinsic color information characterizes the group of color images in a manner that increases the image quality of a reconstructed image sequence while reducing the size of a compressed video file and transmission time for the image sequence that comprises the video.

In the following description of the preferred embodiment, reference is made to the accompanying drawings that form a part thereof, and in which is shown by way of illustration a specific embodiment in which the invention may be practiced. It is to be understood that other embodiments may be utilized and changes may be made without departing from the scope of the present invention.

BRIEF DESCRIPTION OF THE DRAWINGS

The details of the present invention, both as to its structure and operation can best be understood by referring to the following description with reference to the accompanying drawings in which.

DETAILED DESCRIPTION OF THE INVENTION

Figure 1:
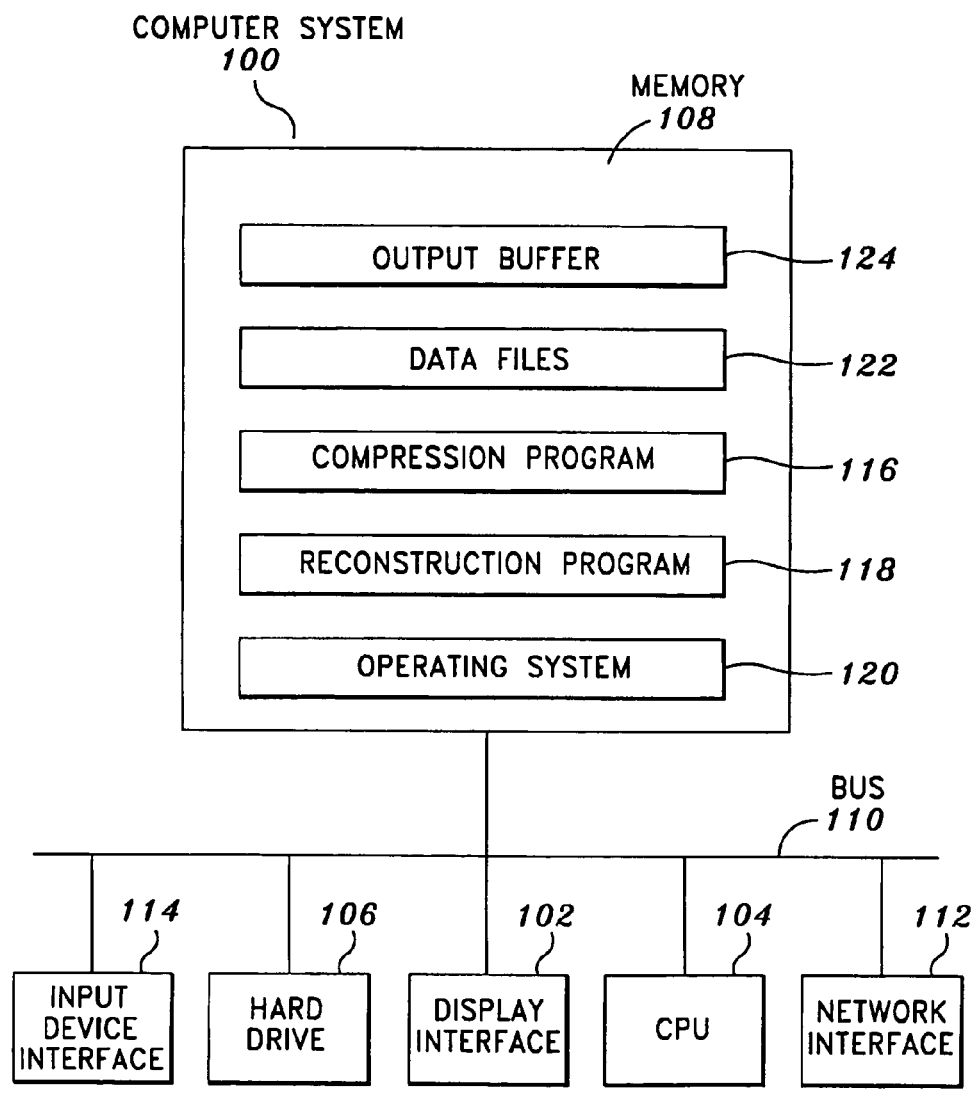
FIG. 1 is a functional block diagram of a computer in which the invention of the present invention can be carried out.

The present invention is now described more fully hereinafter with reference to the accompanying drawings that show preferred embodiments of the invention. This invention, however, may be embodied in many different forms and should not be construed as limited to the embodiments set forth herein. Appropriately, these embodiments are provided so that this disclosure will be thorough and complete, and will fully convey the scope of the invention. As will be appreciated by one having skill in the art, the present invention may be embodied as a method, data processing system, or computer program product. Accordingly, the present invention combines software and hardware to produce the embodiments described in further detail below. Furthermore, the present invention may take the form of a computer program product on a computer-readable storage medium having computer-readable program code means embodied in the medium. Any suitable computer-readable medium may be utilized including hard disks, CD-ROMs, floppy disks, optical storage devices, magnetic storage devices, etc.

The present invention is described below with reference to flowchart illustrations of methods, apparatus (systems) and computer program products according to the invention. It will be understood that each block of the flowchart illustrations, and combinations of blocks in the flowchart illustrations, can be implemented by computer program instructions. These computer program instructions may be loaded onto a general-purpose computer, special purpose computer, or other programmable data processing apparatus to produce a machine. These computer program instructions, which execute on the computer or other programmable data processing apparatus, create means for implementing the functions specified in the flowchart block or blocks. These computer program instructions may be stored in a computer-readable memory to direct a computer or other programmable data processing apparatus to function in a particular manner, producing an article of manufacture including instruction means which implement the function specified in the flowchart block or blocks. The computer program instructions may also be loaded onto a computer or other programmable data processing apparatus to cause a series of operational steps to be performed, producing a computer implemented process, such that the computer or other programmable apparatus provide steps for implementing the functions specified in the flowchart block or blocks. In one implementation, these computer program instructions are written in the C programming language. It is to be appreciated, however, that these routines may be implemented in any of a wide variety of programming languages.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring now to FIG. 1, a block diagram of a computer system is illustrated for implementing the methods and computer program product in accordance with the preferred embodiment of the present invention. Computer system 100 includes a display interface 102 for visually displaying information to a computer user, a central processing unit (CPU) 104, hard drive 106, main memory 108, network interface 112, input device interface 114, and output buffer 124. As shown, the various components of the system 100 communicate through a system bus 110 or similar architecture. Typically, CPU 104 is a microprocessor, such as an INTEL PENTIUM processor, but may also be any processor that executes program instructions in order to carry out the functions of the present invention. Input device interface 114 provides the capability to input data to computer system 100. For example, input device interface 114 may include a keyboard (not shown) or a mouse (not shown). Network interface 112 provides for data to be transmitted and received over a network.

Memory 108 stores data, such as compression routine 116, reconstruction routine 118, operating system 120, and a plurality of data files 122. Data files 122 can include, among other data, single image files and image sequence files, either of which can be processed according to the present invention. Compression processing routine 116 and reconstruction processing routine 118 are computer program instructions executed by CPU 104 that may be loaded into memory 108. The routines 116 and 118 implement the functions, as described in detail hereinafter, performed by the present invention. In addition, processing routines 116 and 118 may also be stored on computer readable media and used therefrom by computer system 100 to perform the specified functions or steps in accordance with the present invention. Operating system 120 provides overall system functionality. The output buffer 124 stores uncompressed image data for display on display 102. While the preferred embodiment is implemented on a computer system, one having ordinary skill in the art will recognize that the methods and computer program product in accordance with the present invention can be implemented on any system provided with a central processing unit, input/output circuitry, and a memory, such as a digital camera and the like.

Figure 2A:
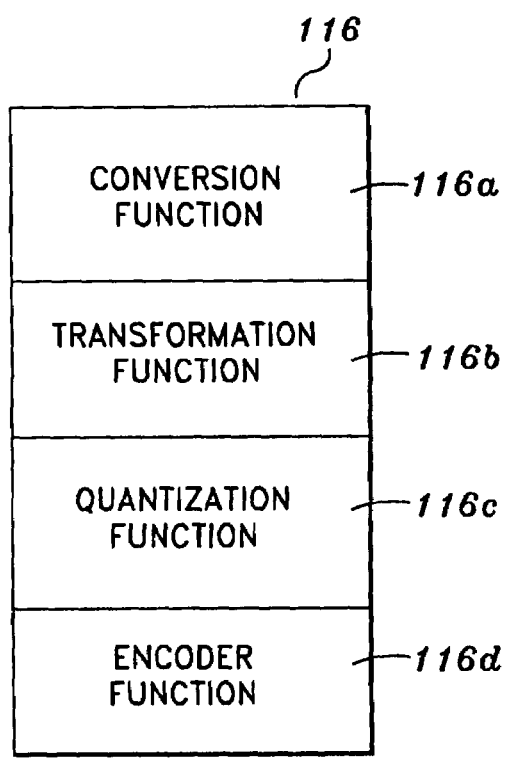
FIGS. 2A and 2B depict block diagrams of the routines that implement the method of the present invention.
Figure 2B:
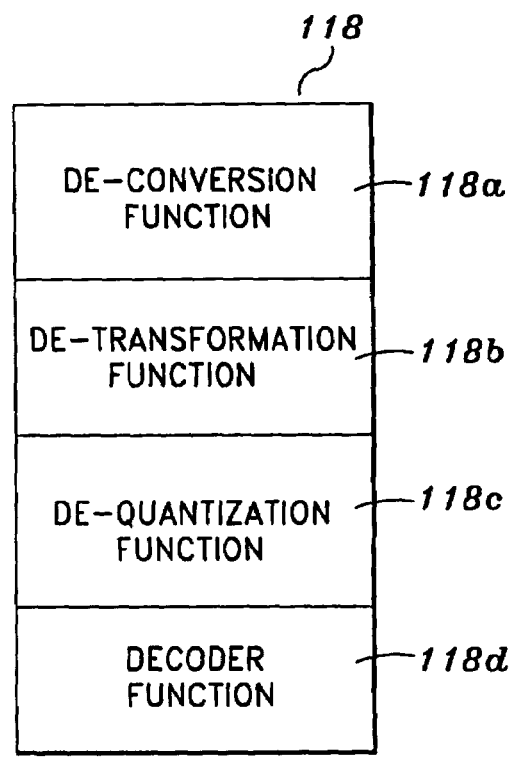

In FIG. 2A, a more detailed view of the functions implementing the compression routine 116 is depicted. The compression routine includes a conversion function 116a, a transformation function 116b, a quantizer function 116c, and an encoder function 116d. In FIG. 2B, the functions implementing the reconstruction routine 118 are shown. Reconstruction routine includes a de-conversion function 118a, a de-transformation function 118b, a de-quantizer function 118c, and a decoder function 118d. As will be described in detail below the present invention enables the computer system, under the direction of routines 116a–116d and 118a–118d to compress and reconstruct color images, and particularly individual frames of an image sequence, with less loss of image quality.

Figure 3:
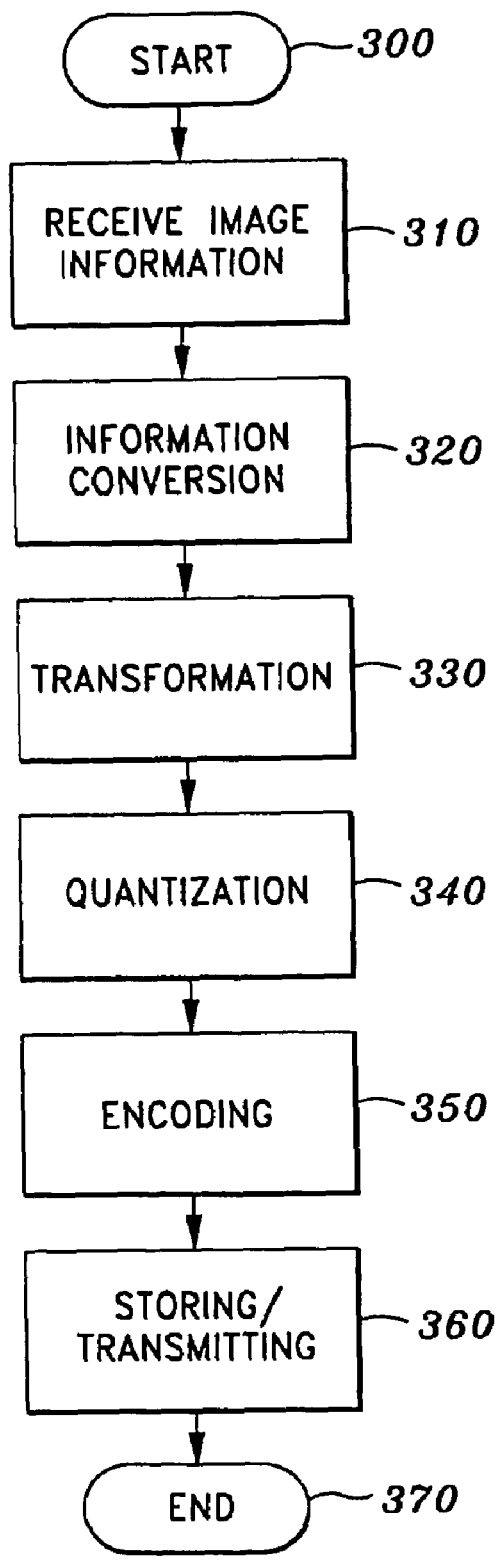
FIG. 3 is a flow diagram of the method performed in the computer of FIG. 1, in accordance with the present invention.

In FIG. 3, the process for compressing a color image is depicted as a block diagram. As mentioned above, the color image can represent a single image or a frame from an image sequence. In Step 300, the compression process begins. In Step 310, the process receives input image information corresponding to a color image obtained and designated for compression. For example, the obtained color image can be one of a scanned raster image, a photograph from a digital camera, or a satellite image, such as Space Imaging's IKONOS™, CNES/France's SPOT and the United States' Landsat, or an image sequence. The image can be obtained and designated in many forms, such as a user-initiated download. The input image information includes a plurality of numerical value sets representing the obtained color image in one of a plurality of normal color space signal formats. A normal color space signal format is a set of three numerical values which characterizes an image's colors in a particular color system using spectral weighting functions.

In the preferred embodiment, the obtained color image is represented in the normal color space signal format RGB. In an alternative embodiment, the color image can be represented in the CMYK normal color space signal format. Each set of three numerical values of the plurality of numerical value sets is associated with a pixel in the array of pixels associated with the obtained color image. The set of values in the normal color space signal format of the preferred embodiment is provided as a color triple, such as (0,0,0). Each numerical value in the set corresponds to a color component used by the color system. The color components are used in combination by the particular color system to represent colors. Variation of the numerical values in a set varies the represented color of the associated pixel. For example, the set of three numerical values or color triple $0_R, 0_G, 0_B$ represents the color black, where the numerical values correspond respectively to the red, green, and blue components for generating the color black in the RGB color system. The plurality of numerical value sets enables the display of images or image sequences for viewing on display 102, as well as the compression and reconstruction of an image, or image sequence.

In Step 320, the received input image information is converted into intrinsic color information in response to the CPU 104 executing the conversion function 116a. The Karhunen-Loeve transformation generates the intrinsic color information. Intrinsic color information is image pixel information provided in a manner that the most information about an image is presented in the first component. The intrinsic color information includes a plurality of value sets for the designated image. The plurality of value sets represents the designated image in a principal components space signal format. The principal components space signal format is based on, and defined by the color image's intrinsic color distribution. The details for converting the received color image information into intrinsic color information Step 320 using the Karhunen-Loeve transformation will be described more fully below with reference to FIG. 4.

In Step 330, the CPU 104, under the instruction of the transformation function 116b, performs an approximation of the values in the plurality of intrinsic value sets, described more fully below, in response to receiving the intrinsic color information generated in Step 310. The transformation function 116b applies trigonometric functions to the intrinsic color information, in accordance with the JPEG (or MPEG in the case that the image is an image sequence frame), discrete cosine transform ("DCT") compression standards, to generate a plurality of approximation values. The DCT is a relative of the Fourier transform and likewise gives a frequency map. The motivation for doing this is that you can now throw away high-frequency information without affecting low-frequency information. The DCT transform itself is reversible except for round-off error. The techniques and methods for implementing the JPEG and MPEG discrete cosine transforms are well known in the art. The details for transforming the intrinsic color information into transformed information using an MPEG DCT algorithm are described more fully below.

Figure 10:
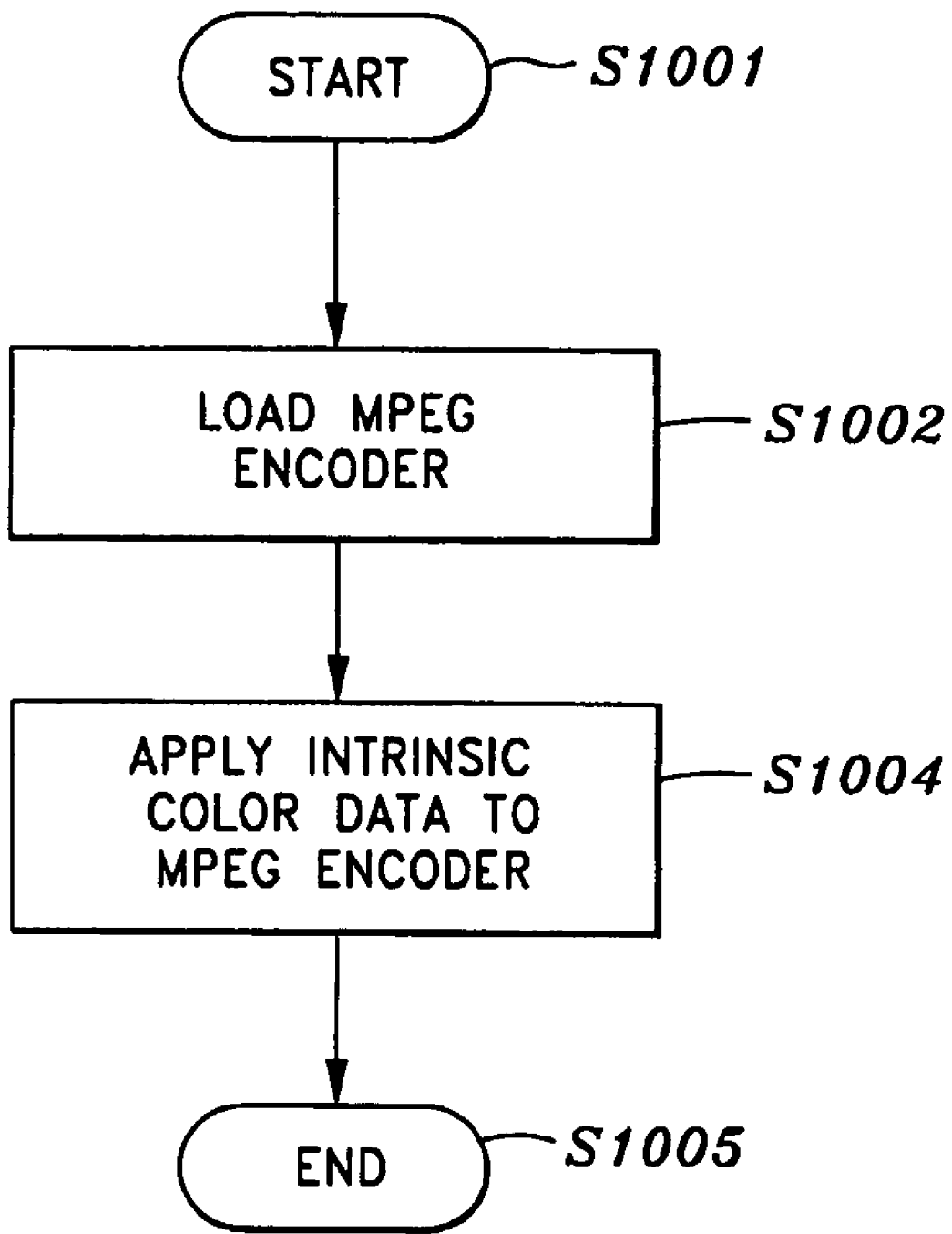
FIG. 10 is a flow diagram of the transformation function for MPEG encoding according to one embodiment of the present invention.

In this regard, FIG. 10 is a flow diagram of the transformation function for MPEG images according to one embodiment of the present invention. Specifically, FIG. 10 further illustrates the process for transforming intrinsic color information into transformed information using an MPEG DCT algorithm. The process begins (step S1001), and an MPEG encoder is loaded from a data storage medium such as hard drive 106 into memory 108 (step S1002). The intrinsic color data, which was converted from color image information in step 320 by conversion function 116a, is applied to the MPEG encoder (step S1004), and MPEG encoder converts the intrinsic color data to transformed information, and the process ends (step S1005).

The present invention uses MPEG compression to transform image data of an image sequence in RGB or CMYK to principal components color space. MPEG, like JPEG, currently uses a fixed color transformation in encoding image sequences. The present invention produces image specific color transformations. A covariance matrix is produced for individual frames and used to produce an eigenspace transformation that better allocates color information into the color components used in the MPEG compression process. A principal components approach ensures that the Y channel contains the maximum allowable image entropy, since the Y channel of a YCC color space conventionally contains luminance information. This results in better quality image transmission and reduced file size for an image sequence, as an effect of MPEG compression.

Returning to FIG. 3, in Step 340, the CPU 104, under the instruction of quantizer function 116c, performs the quantization process in response to receiving the plurality of approximation values in Step 330. The quantization process reduces or truncates the plurality of approximation values to a predetermined range of integer values, and thus, reduces the number of bits that are required to represent the approximation values. Quantization is performed by dividing each approximation value by a predetermined value. Generally, the predetermined value is obtained from an entry in a quantization table. It will be readily apparent to one having ordinary skill in the art that the entries in the quantization table may vary to optimize operation with a particular type of image data.

In Step 350, the CPU 104, under the instruction of encoding function 116d, performs the encoding process in response to receiving the plurality of quantized approximation values in Step 340. The encoding process reduces the number of bits that are used to represent the quantized approximation values. The reduction can be accomplished using Huffman coding. The coding replaces subsets of bit information corresponding to quantized approximation values with bit information that more efficiently represents the subsets of bit information. The encoding process generates a reduced stream of bits which compactly represents the quantized approximation values in a non-redundant manner. The reduced bit stream generated by the encoding process corresponds to a compressed representation of the color image for each frame of an image sequence. The techniques and methods for encoding information are well known in the art.

In Step 360, the reduced bit stream corresponding to each image for each frame of an image sequence is stored as a file. In one embodiment, the file can be stored in memory of computer 100. In an alternative embodiment, the file can be transmitted to remote computer 900 at remote location using network interface 112 and stored in memory 902. A user may access the file from memory at a future time for transmission and decompression. The resultant file has dramatic size and image quality improvements over conventional methods. In addition, compression-specific non-pixel information generated by the conversion routine 116a is stored and or transmitted in association with the reduced bit stream data and represents the quantized approximation values to enable the reconstruction of the color image for each frame of the image sequence.

The non-pixel data includes the mean vector, the eigenmatrix and scale factors for the particular image. The non-pixel information is used to restore the color image to near original form during reconstruction. In the preferred embodiment, compression-specific non-pixel information is provided inside JPEG application-specific markers or tags, or inside MPEG application-specific markers or tags in the case of an image sequence, and stored in the file as ASCII or binary data. In an alternative embodiment, the bit stream may be transmitted to a computer 900 at a remote location using a network interface 112 and stored in memory 902. One having ordinary skill in the art would recognize and appreciate such transmission modalities include but are not limited to modems and wireless devices. The compression-specific non-pixel information is transmitted with the bit stream using markers or tags, and ultimately used by the remote system to reconstruct each compressed image of the image sequence.

Figure 4:
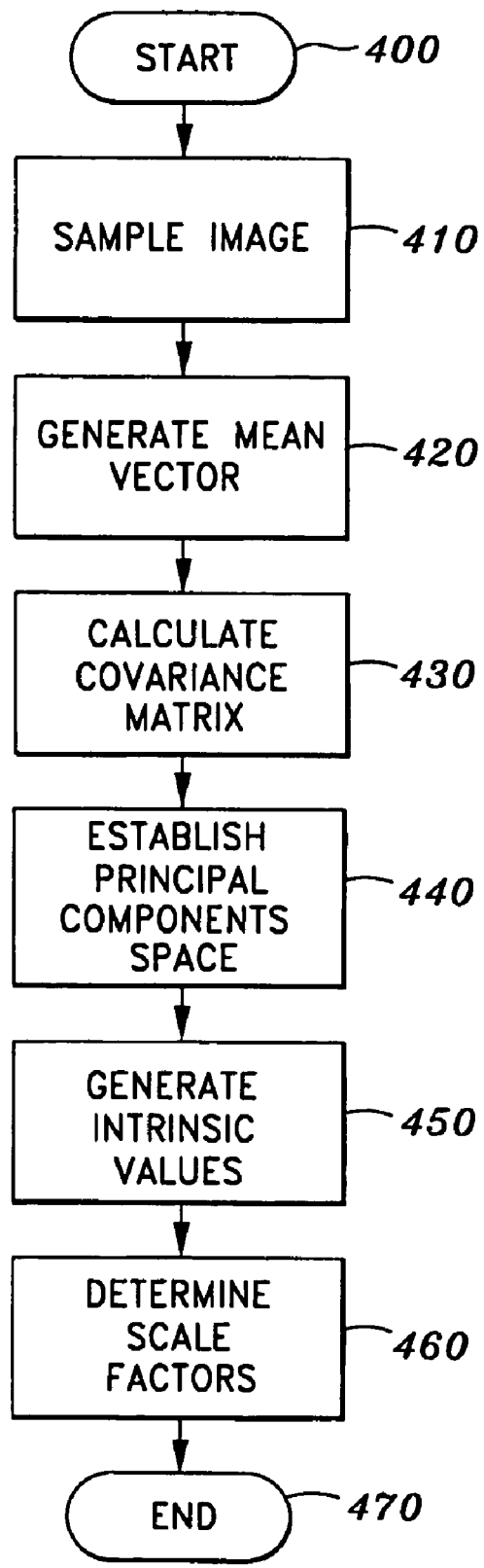
FIG. 4 is a flow diagram of the conversion function implemented by the method of the present invention.

In FIG. 4, the conversion function 116a of the present invention, discussed generally above in FIG. 3, is now fully set forth in a block diagram. The conversion function implements a Karhunen-Loeve (KL) color transformation to generate intrinsic color information that is specific and unique to an individual color image. The KL transform uses a color image's color statistics and color distribution to compute and establish a principal components space having a coordinate system particular to the image. The axes of the principal components space are defined by the color distribution of the image, and thus vary from image to image.

In Step 400, the KL transform begins. In Step 410, input color information, obtained in Step 310, is received to generate the mean vector for the color image. The mean vector consists of three floating-point numbers and is represented by the formula $m=(m_R \ m_G \ m_B)^T$. Each floating-point number of the mean vector corresponds to the average value of the respective color component, as designated by the subscript, of sampled pixels. For example, the floating-point number $m_R$ will be the average of the red color component values for the sampled pixels. In the preferred embodiment, the process samples every eighth pixel across in a row and down in a column starting from the upper left corner pixel to obtain a sufficient statistical sampling, customarily considered to be greater than two thousand pixels. One having ordinary skill in the art will recognize that the sampling frequency and sampling set size can be modified without departing from the scope and spirit of the invention claimed herein.

Figure 5:
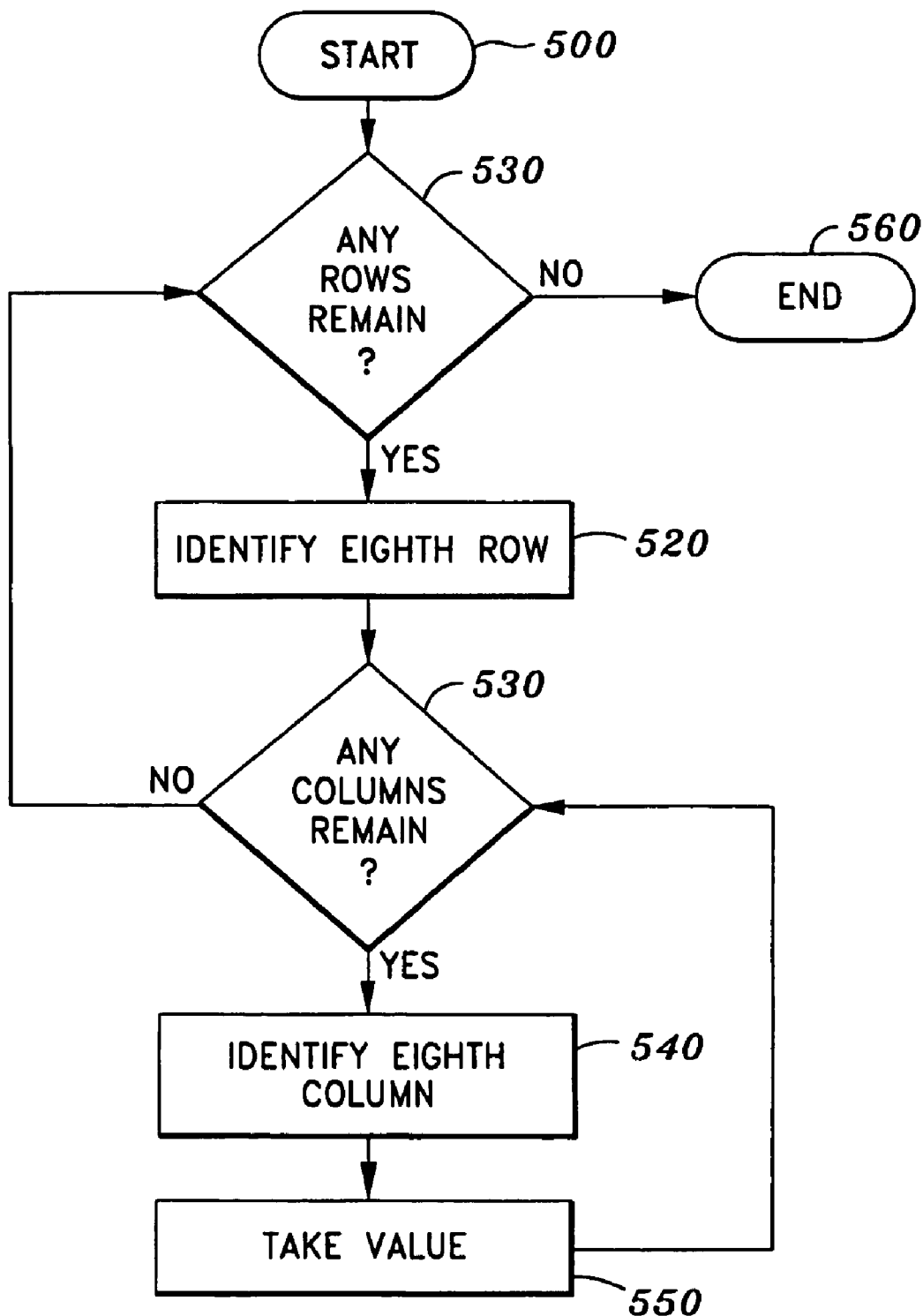
FIG. 5 is a flow diagram of the sampling algorithm performed for generating the mean vector of a color image.

Referring briefly to FIG. 5, the sampling algorithm performed in Step 410 is provided in a flowchart. In Step 500, the process starts by locating the pixel in the upper left corner of the color image. In Step 510, the process determines whether there are any remaining rows of pixels in the image to be sampled. If there are rows in the image to be sampled, the process proceeds to Step 520 where the sampling process identifies an eighth row of pixels in the image. If there are no rows to be sampled in image, the process jumps to Step 560. In Step 530, the process determines whether there are any remaining columns in the row of pixels to be sampled. If there are columns in the row of pixels to be sampled, the process proceeds to Step 540 where the sampling process identifies an eighth column in the row. If there are no columns to be sampled in the row, the process returns to Step 510. In Step 550, each value in the numerical value set for the pixel having the position corresponding to the identified row and column is taken and stored for subsequent statistical processing. In Step 560, the sampling process terminates.

Returning again to FIG. 4, in Step 420 all the numerical values taken for a respective color component from sampled pixels are added together to calculate a total component value for the respective color component. For example, all the red color component values from the sample pixels are added to produce a red component total value. The green and blue components total values are generated in a like manner. Once calculated, each of the color component totals are divided by the number of pixels sampled producing the mean vector of the image. The generated mean vector is stored for later use as non-pixel data.

Figures 6, 7:
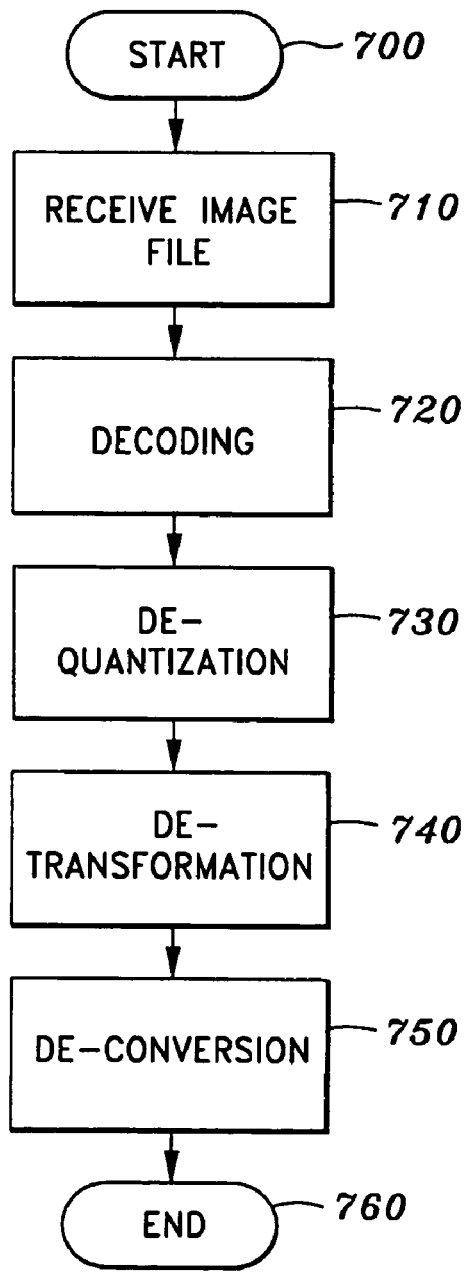
FIG. 6 is an illustration of the covariance matrix generated by the conversion function.
FIG. 7 is a block diagram of the process for reconstructing a color image, depicted as a block diagram.

In Step 430, the covariance matrix is computed using the mean vector generated in Step 410. The covariance matrix is a 3×3 floating point matrix. The matrix is computed as defined by the formula $C=E[(p-m)(p-m)^T]$, where p represents the numerical value set of a pixel in the color image, m represents the mean vector, and E represents the expected value of the original image. The covariance matrix is generated for the sampled points by subtracting each floating-point number of the mean vector from its corresponding color component value in the numerical value set of a sampled pixel. The 3×3 covariance matrix C is illustrated in FIG. 6 with equations shown for obtaining each entry from the native (r,g,b) pixel triples.

Returning again to FIG. 4, in Step 440 the statistical color distribution of the obtained and designated color image is used to establish a principal components space. The principal components space is a coordinate system that uses the mean vector as the center of the system. As the center of the principal components space, the mean vector reduces the elimination of color information that has a high concentration in the image. The color image's statistical color distribution is considered when the eigenvalues of the covariance matrix C, and the respective eigenvectors are generated using the formula $Ct_k=e_k t_k$, where t represents an eigenvector, e represents an eigenvalue, and C represents the covariance matrix generated in Step 430. The subscript k ranges from 1 to 3. This can be accomplished using known programming packages for solving eigensystems (e.g., LINPACK, EISPACK).

The first eigenvector generated represents the first coordinate axis in principal components space. This first eigenvector passes through the center of the principal components space in a direction that explains the most color variation from the mean vector. In addition, the first value in a value set of the intrinsic color information corresponds to a coordinate on the first coordinate axis. The second eigenvector generated represents the second coordinate axis in principal components space. The second eigenvector is orthogonal to the first eigenvector and explains as much of the remaining color variance as possible. The second value in a value set of the intrinsic color information corresponds to a coordinate on the second coordinate axis. The third eigenvector generated represents the third coordinate axis in principal components space. The third principal component is orthogonal to the first and second eigenvectors and explains the remaining color variation. The third value in a value set of the intrinsic color information corresponds to a coordinate on the third coordinate axis. The first, second and third eigenvectors are arranged into an eigenmatrix T. The matrix T is specific to the image since the eigenvectors are defined by the image's color statistics, and thus varies from image to image. Moreover, the matrix has the property that the transpose of the matrix T is its own inverse. Accordingly, the eigenmatrix T is used to convert a color image represented, for example, in RGB color space to principal components color space. In a like manner, the transpose of the eigenmatrix T is used to convert a color image represented in principal components color space to RGB color space. The generated eigenmatrix T is stored for later use as non-pixel data.

In Step 450, the sets of numerical values which characterize the image in a normal color space are converted into intrinsic color value sets that characterize the color image in principal components space. The conversion uses the mean vector generated in Step 420 and the eigenmatrix generated in Step 440 to generate intrinsic color values that characterize the color image in principal components space. The formula for performing the conversion is defined by $p^c=T(p-m)$, where T is the eigenmatrix, m is the mean vector and p is the numerical value set of a pixel in the image. The intrinsic color value sets in principal components space are generated by subtracting the mean vector values from corresponding color component values in a numerical value set and multiplying the results of the subtractions by the eigenmatrix T. The intrinsic value sets are a plurality of three floating point values that correspond to the first, second and third principal component space coordinates. This conversion is performed for each numerical value set of a color image to produce a corresponding number of intrinsic color value sets.

In Step 460, scale factors are generated to enable the principal components space coordinates to be mapped into integer byte values. The scale factors include scale and offset values, in the form of floating point numbers, for each axis in principal components space. To compute the scale and offset values, the minimum and maximum principal components space coordinates for each principal components space axis must be identified. Upon identifying the minimum and maximum principal space coordinates, scale and offset values are determined to map principal components space coordinates from the range [min . . . max] into the range [0 . . . 255], where [0 . . . 255] is the range of values an unsigned byte quantity can assume. The offset values correspond to the minimum coordinate values associated with each principal coordinate axis. Accordingly, the minimum coordinate value on each axis is selected as the offset for the axis. The scale values correspond to the maximum coordinate values subtracted from the minimum coordinate values for each principal coordinate axis divided by 255. The scale and offset values are stored for later use as non-pixel data. In Step 470, the process terminates. Upon completion, the plurality of intrinsic value sets of the intrinsic color information is provided to the transformation function 116*b* described above for approximation and quantization using discrete cosine transformation (DCT).

In FIG. 7, the process for reconstructing a color image, such as a single image or a frame of an image sequence, is depicted as a block diagram. The reconstruction can be performed on any computer system 100 or 900 having the reconstruction program stored therein. In Step 700, the reconstruction process begins. In Step 710, the process receives a file including information corresponding to an image or multiple frames of an image sequence, compressed using the technique described in FIG. 3 through FIG. 6. Accordingly, the information provided in the file is reduced image information and non-pixel data. In Step 720, the CPU 104, under the instruction of decoder function 118*d*, performs an inverse encoding process. The inverse encoding process replaces the reduced image information, which is a stream of bits that compactly represents the image in a non-redundant manner, with a bit stream that originally represented the color image. More specifically, the bit stream that originally represented the quantized approximation values is generated. The techniques and methods for decoding information are well known in the art.

In Step 730, the CPU 104, under the instruction of dequantization function 118*c*, performs an inverse quantization process in response to receiving the bit stream that originally represented the quantized approximation values. The dequantization process returns the plurality of quantized approximation values to there near original range of approximation values. As in the quantization Step 340 above, the process is achieved using a quantization table.

In Step 740, the CPU 104, under the instruction of the transformation function 118*b*, performs an inverse approximation of the original approximation values. The process generates a plurality of value sets that are substantially similar to the original plurality of intrinsic value sets. The transformation function 118*b* applies the inverse of the JPEG (or MPEG in the case of an image sequence) DCT to generate the plurality of value sets that are substantially similar to the original plurality of intrinsic value sets. The techniques and methods for implementing the inverse JPEG or MPEG DCT are well known in the art.

In Step 750, the substantially similar plurality of intrinsic value sets are converted back to numerical value sets that characterize the color image in normal color space. The conversion of the intrinsic value sets to numerical value sets is accomplished using the non-pixel data. The process converts the values of the intrinsic value sets from floating point numbers to unsigned byte numbers.

In Step 760 the process ends. Information corresponding to the numerical values sets are transmitted to the output buffer 124 for display on display interface 102.

Figure 8:
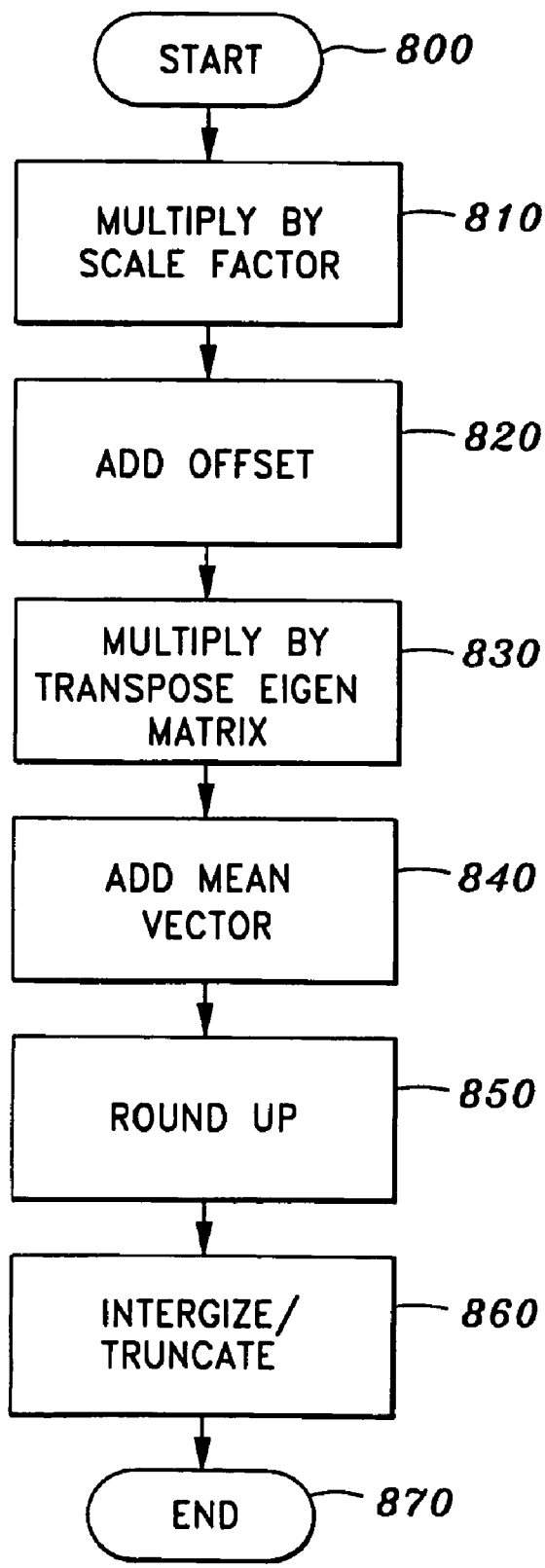
FIG. 8 is a flow diagram for the method of converting the plurality of intrinsic value sets to numerical value sets.

Referring briefly to FIG. 8, the method of converting the plurality of intrinsic value sets to numerical value sets is depicted. In Step 800 the process begins. In Step 810, each principal coordinate value in an intrinsic value set is multiplied by its corresponding scale factor. This step is repeated for each intrinsic value set that is in the plurality of intrinsic value sets. In Step 820, each principal coordinate value in an intrinsic value set is added to its corresponding offset. Like Step 810, this step is repeated for each intrinsic value set that is in the plurality of intrinsic value sets. In Step 830, each intrinsic value set in the plurality of intrinsic value sets is multiplied by the transpose of the eigenmatrix T. In Step 840, the mean vector is added to each intrinsic value in the plurality of intrinsic value sets. In Step 850, a value of 0.5 is added to each intrinsic value in the plurality of intrinsic value sets. In Step 860, each intrinsic value in the plurality of intrinsic value sets is truncated to a whole value. In addition, intrinsic values that are less than zero are made equal to zero and intrinsic values that are greater than 255 are made equal to 255. The process terminates in Step 870.

Figure 9:
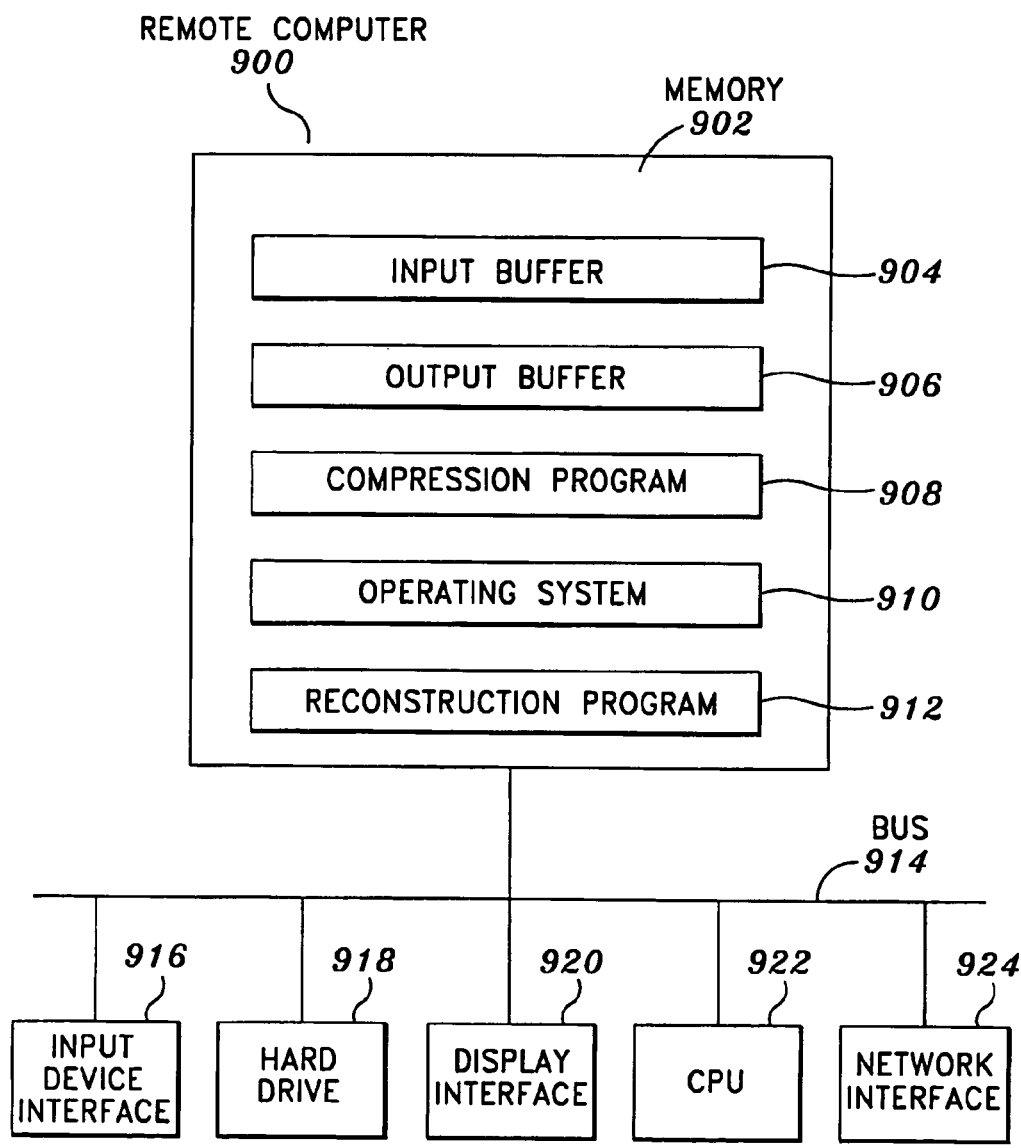
FIG. 9 is a functional block diagram of a remote computer in which the invention of the present invention can be carried out.
Figure 11:
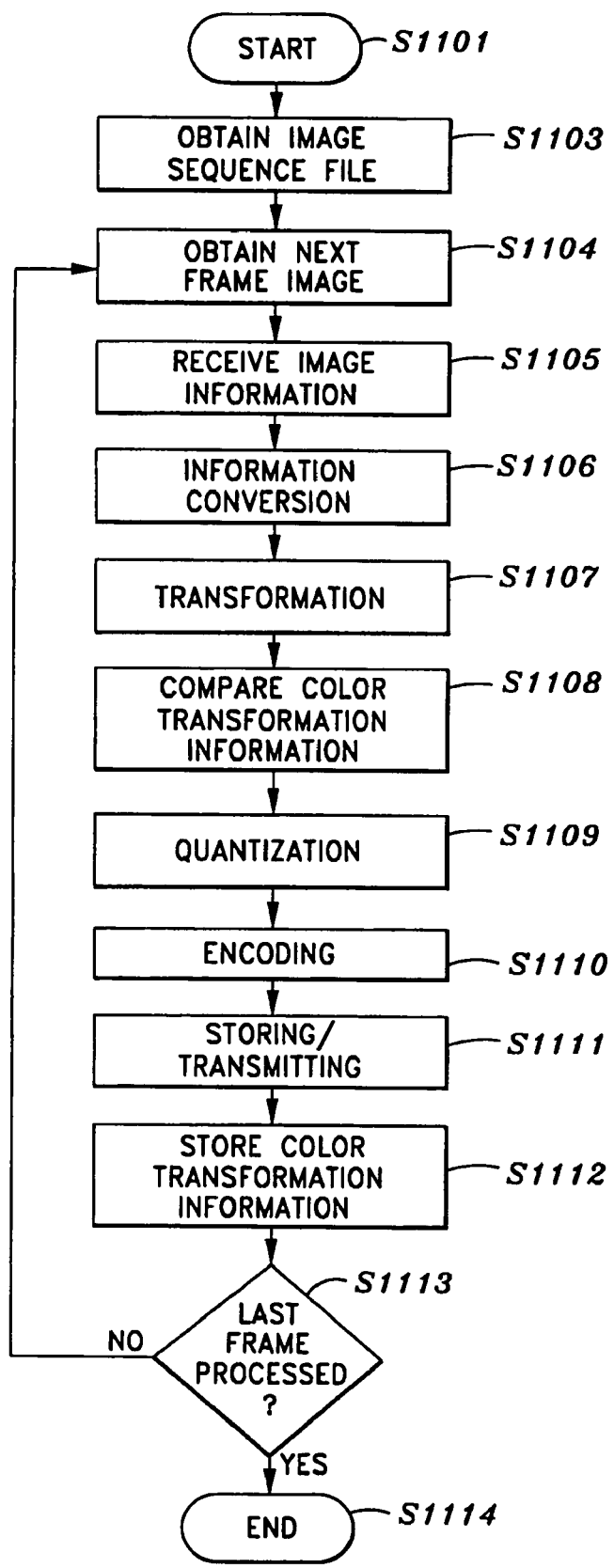
FIG. 11 is a depiction of the transformation and compression of an image sequence according to one embodiment of the present invention.

FIG. 9 simply represents a remote computer 900 in which the present invention can also be practiced. Remote computer 900 is similar to computer system 100 of FIG. 1, and the similar components are therefore not described again for the sake of brevity. The difference between remote computer 900 and computer system 100 is that memory 902 of remote computer 900 includes input buffer 904 instead of data files. In this manner, remote computer 900 receives data files, such as an image or image sequence, from a remote source FIG. 11 is a depiction of the transformation and compression of an image sequence according to one embodiment of the present invention. In more detail, the process begins (step S1101), and an image sequence file is obtained (step S1103). The image sequence file is obtained from data files 122 if the present invention is practiced in computer system 100, or from input buffer 904 if the present invention is practiced in remote computer 900. The next frame image is obtained from the image sequence file (step S1104), where the next frame image represents a color image from an image sequence. If no previous frame image has been obtained, the "next" frame is the first frame of the image sequence.

Image information is received (step S1105), and converted (step S1106) into intrinsic color information. The intrinsic color information is used to transform the color image and a variable number of succeeding frames into principal components space for use in the MPEG DCT algorithm. During the conversion step (step S1106), non-pixel data associated with the color image, such as an eigenmatrix, scale factors and a mean vector, are generated. Since the processes described in steps S1105 and S1106 are similar to those described more fully above in steps 310 and 320 (FIG. 3), a more detailed description is omitted for the sake of brevity.

The converted image information is transformed (step S1107). The conversion process is described above in step 330 (FIG. 3).

Color transformation information, including the non-pixel data, is compared with buffered data (step S1108), where the buffered data represents stored non-pixel data generated during the compression of a preceding image frame. The comparison determines whether the color transformation information deviates from the buffered data, where the results of this comparison are used in subsequent steps of the compression process (to be described more fully below). The color transformation information is based on the color image's intrinsic color distribution, and the buffered data is based upon a previous frame's color distribution. In an alternate arrangement of the present invention, step S1108 is omitted.

The transformed color information is then quantized (step S1109) and encoded (step S1110) using processes described above in steps 340 and 350 (FIG. 3), respectively.

The encoded information is either stored or transmitted (step S1111), using the process described above in step 360. Based upon the comparison made in step S1108, the present invention also determines when updates of the intrinsic color information are computed, as a factor of how successor frames deviate from the previous color statistics. If the non-pixel data deviates from the buffered data, the non-pixel data is stored as the buffered data, and the non-pixel data is stored in association with the encoded information. In this regard, the intrinsic color information is melded into the encoded bit stream of compressed imagery data and stored.

In the alternate arrangement of the present invention in which step S1108 is omitted, the non-pixel data is stored in association with the encoded information.

The intrinsic color information characterizes the group of color images in a manner that increases the image quality of a reconstructed image sequence, while reducing the size of a compressed video file and transmission time for the image sequence that comprises the video. By doing so, the present invention compresses a video sequence of color images utilizing a transformation that varies for variable-length subsequences of images, depending upon color distribution statistics.

Once the image information has been stored or transmitted, it is determined whether the last frame image was processed (step S1113). If the last frame image was processed, indicating that there are no more image frames in the image sequence, processing ends (step S1114). If there are additional image frames in the image sequence, the next frame image is obtained (step S1104).

Figure 12:
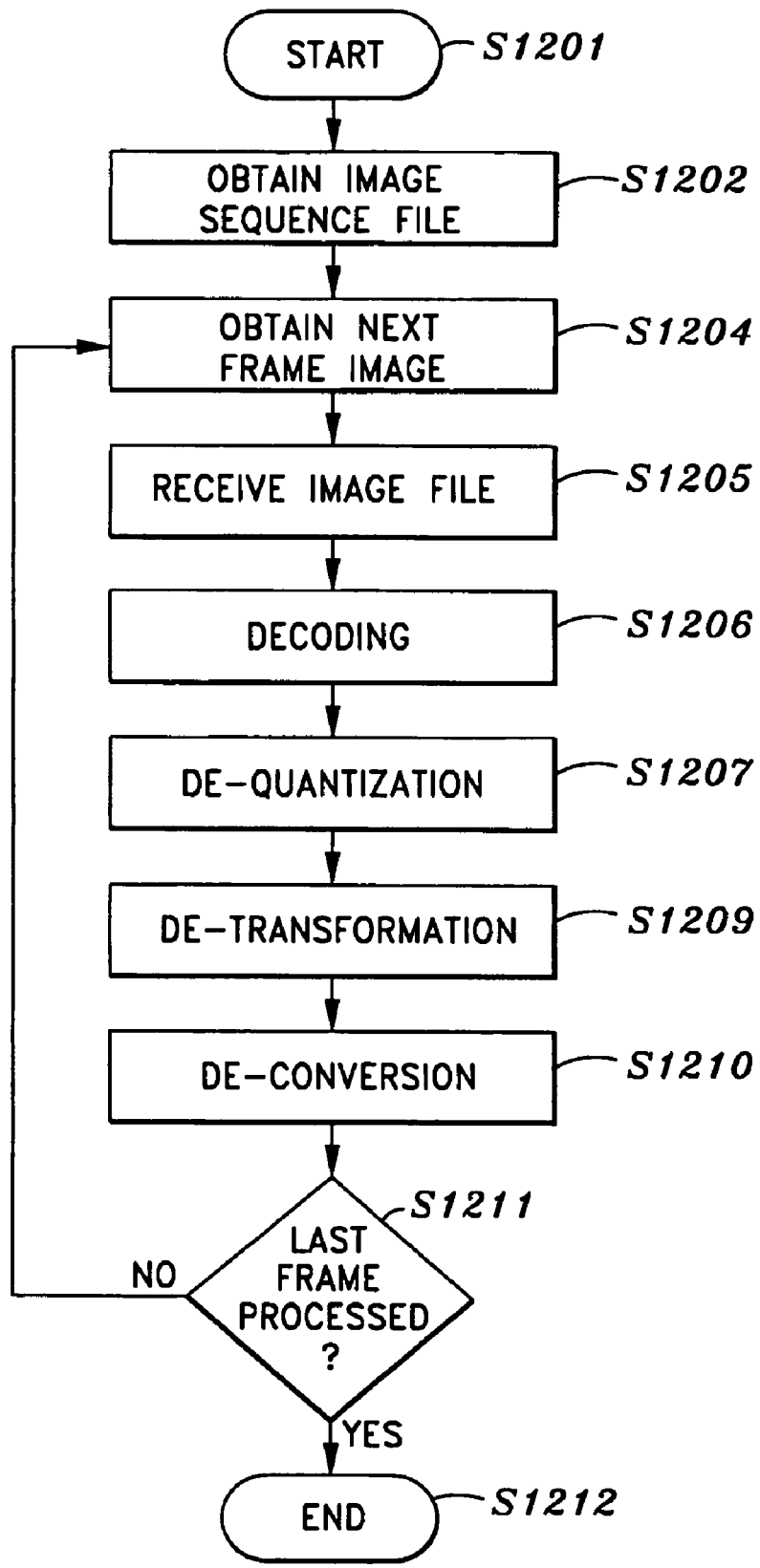
FIG. 12 depicts the reconstruction of an image sequence according to one embodiment of the present invention.

FIG. 12 depicts the reconstruction of an image sequence according to one embodiment of the present invention. In more detail, the process begins (step S1201), and an image sequence file is obtained (step S1202) from data files 122 or from input buffer 904. The next frame image is obtained from the image sequence file (step S1204). If no previous frame image has been obtained, the "next" frame is the first frame.

The image file is received (step S1205), and decoded (step S1206), and the decoded image file is de-quantized (step S1207), and then de-transformed (step S1209). The de-transformed image file is then de-converted (step S1210). Since the processes described in steps S1205 to S1210 are similar to those described more fully above in steps 710 to 750 (FIG. 7), a more detailed description is omitted.

Next, it is determined whether the last frame image was processed (step S1211). If the last frame image was processed, indicating that there are no more image frames in the image sequence, processing ends (step S1212). If there are additional image frames in the image sequence, the next frame image is obtained (step S1204).

Thus, according to the foregoing, the present invention can be applied to a single image (JPEG) or an image sequence (MPEG) to achieve better image quality and reduced file size for efficient transmission.

Although specific embodiments of the present invention have been described, it will be understood by those skilled in the art that there are other embodiments that are equivalent to the described embodiments. Accordingly it is to be understood that the invention is not to be limited by the specific illustrated embodiments, but only by the scope of the appended claims.

What is claimed is:

1. A method for compressing a color image, comprising the steps of:
   receiving color image information for a color image;
   converting the color image information into intrinsic color information;
   transforming the intrinsic color information into transformed information using an MPEG DCT algorithm;
   quantizing the transformed information into quantized information;
   encoding the quantized information into encoded information; and
   storing the encoded information.

2. The method of claim 1, wherein the intrinsic color information represents the color image in a principal components space.

3. The method for compressing a color image according to claim 1, further comprising the step of generating non-pixel data associated with the color image.

4. The method for compressing a color image according to claim 3, wherein said non-pixel data includes an eigen-matrix, scale factors, and a mean vector.

5. The method for compressing a color image according to claim 3, further comprising the steps of:
   comparing the non-pixel data with buffered data,
   wherein if the non-pixel data deviates from the buffered data, the non-pixel data is stored as the buffered data, and the non-pixel data is stored in association with the encoded information.

6. The method for compressing a color image according to claim 3, further comprising the step of storing the non-pixel data in association with the encoded information.

7. A system for compressing a color image, comprising:
   means for receiving color image information for a color image;
   means for converting the color image information into intrinsic color information;
   means for transforming the intrinsic color information into transformed information using an MPEG DCT algorithm;
   means for quantizing the transformed information into quantized information;
   a means for encoding the quantized information into encoded information; and
   a means for storing the encoded information.

8. The system for compressing a color image according to claim 7, wherein the intrinsic color information represents the color image in a principal components space.

9. The system for compressing a color image according to claim 7, further comprising a means for generating non-pixel data associated with the color image.

10. The system for compressing a color image according to claim 9, wherein the non-pixel data includes an eigenmatrix, scale factors, and a mean vector.

11. The system for compressing a color image according to claim 9, further comprising:
- a means for comparing the generated non-pixel data with buffered data;
- a means for storing the non-pixel data as buffered data, if the non-pixel data deviates from the buffered data; and
- a means for storing the non-pixel data in association with the encoded information, if the non-pixel data deviates from the buffered data.

12. The computer-readable storage medium according to claim 11, wherein the intrinsic color information represents the color image in a principal components space.

13. The computer-readable storage medium according to claim 11, wherein said program further comprises codes for permitting the computer to perform a generating step for generating non-pixel data associated with the color image.

14. The computer-readable storage medium according to claim 13, wherein the non-pixel data includes an eigenmatrix, scale factors, and a mean vector.

15. The computer-readable storage medium according to claim 13, wherein said program further comprises codes for permitting the computer to perform:
- a comparing step for comparing the generated non-pixel data with buffered data;
- a storing step for storing the non-pixel data as the buffered data, if the non-pixel data deviates from the buffered data; and
- a storing step for storing the non-pixel data in association with the encoded information, if the non-pixel data deviates from the buffered data.

16. The computer-readable storage medium according to claim 13, wherein said program further comprises codes for permitting the computer to perform a storing step for storing the non-pixel data in association with the encoded information.

17. The system for compressing a color image according to claim 9, further comprising a means for storing the non-pixel data in association with the encoded information.

18. A computer-readable storage medium in which is stored a program for compressing a color image, said program comprising codes for permitting the computer to perform:
- a reception step for receiving color image information for a color image;
- a converting step for converting the color image information into intrinsic color information;
- a transforming step for transforming the intrinsic color information into transformed information using an MPEG DCT algorithm;
- a quantizing step for quantizing the transformed information into quantized information;
- an encoding step for encoding the quantized information into encoded information; and
- a storing step for storing the encoded information.

19. A method for compressing and reconstructing a color image, comprising the steps of:
- receiving color image information for a color image;
- converting the color image information into intrinsic color information;
- transforming the intrinsic color information into transformed information using an MPEG DCT algorithm;
- quantizing the transformed information into quantized information;
- encoding the quantized information into encoded information; and
- reconstructing the encoded information using non-pixel data.

20. The method for compressing and reconstructing a color image according to claim 19, wherein the intrinsic color information represents the color image in a principal components space.

21. A method for compressing and reconstructing a color image, comprising the steps of:
- generating intrinsic color information for a color image;
- compressing the intrinsic color information using an MPEG DCT algorithm; and
- reconstructing the color image using non-pixel data.

22. A method for compressing a color image, comprising the steps of:
- generating intrinsic color information for a color image; and
- compressing the intrinsic color information using an MPEG DCT algorithm.

23. A method for compressing a color image from a sequence of color images, comprising the steps of:
- receiving color image information for a color image from a sequence of color images;
- converting the color image information into intrinsic color information;
- transforming the intrinsic color information into transformed information using an MPEG DCT algorithm;
- quantizing the transformed information into quantized information;
- encoding the quantized information into encoded information; and
- storing the encoded information.

24. A method for compressing and reconstructing a color image from a sequence of color images, comprising the steps of:
- receiving color image information for a color image from a sequence of color images;
- converting the color image information into intrinsic color information;
- transforming the intrinsic color information into transformed information using an MPEG DCT algorithm;
- quantizing the transformed information into quantized information;
- encoding the quantized information into encoded information; and
- reconstructing the encoded information using non-pixel data.

* * * * *